United States Patent
Kim et al.

(10) Patent No.: US 9,539,872 B2
(45) Date of Patent: Jan. 10, 2017

(54) MOUNTING UNIT OF SHOCK ABSORBER FOR VEHICLE

(71) Applicant: SUNGWOO HITECH CO., LTD., Busan (KR)

(72) Inventors: Deok Hyun Kim, Busan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 0 days.

(21) Appl. No.: 14/814,482

(22) Filed: Jul. 30, 2015

(65) Prior Publication Data

US 2016/0185175 A1 Jun. 30, 2016

(30) Foreign Application Priority Data

Dec. 30, 2014 (KR) .................. 10-2014-0192931
Dec. 30, 2014 (KR) .................. 10-2014-0192933

(51) Int. Cl.
*B60G 13/00* (2006.01)
*B62D 21/11* (2006.01)

(52) U.S. Cl.
CPC ............. *B60G 13/003* (2013.01); *B62D 21/11* (2013.01)

(58) Field of Classification Search
CPC ... B60G 13/003; B60G 15/067; B60G 15/068; B62D 21/11
See application file for complete search history.

(56) References Cited

U.S. PATENT DOCUMENTS 5,536,035 A * 7/1996 Bautz ................. B60G 3/20
280/124.139
2002/0163155 A1* 11/2002 Kawada ............. B60G 13/003
280/124.155
2004/0232647 A1* 11/2004 Kim ................. B60G 13/003
280/124.155
2005/0093286 A1* 5/2005 Oh ..................... B60G 7/02
280/788
2014/0049019 A1* 2/2014 Ahn ..................... B62D 21/09
280/124.155

FOREIGN PATENT DOCUMENTS

| JP | 2002-019440 | 1/2002 |
| KR | 10-2004-0054878 | 6/2004 |
| KR | 10-0599263 | 7/2006 |
| KR | 10-0643961 | 11/2006 |
| KR | 10-0868409 | 11/2008 |
| KR | 10-2014-0042563 | 4/2014 |

* cited by examiner

*Primary Examiner* — Drew Brown
(74) *Attorney, Agent, or Firm* — Lex IP Meister, PLLC

(57) ABSTRACT

A mounting unit of a shock absorber for a vehicle is disclosed. A mounting unit of a shock absorber for a vehicle that fixes an upper portion of a shock absorber connected to wheels to a vehicle body according to an exemplary embodiment of the present invention may include a shock absorber housing mounted to the vehicle body; a mounting module disposed in the shock absorber housing, and at least two mounting hole is formed at the mounting module; a tapping nut engaged through a mounting hole of the mounting module in the shock absorber housing; and a fixing nut engaged to an end portion of the tapping nut protruded to outside of the shock absorber housing and fixing the mounting module to the shock absorber housing; the mounting module and fixing nut are temporarily assembled to the shock absorber housing through a temporarily assembly apparatus and engaged to the tapping nut.

16 Claims, 13 Drawing Sheets

MOUNTING UNIT OF SHOCK ABSORBER FOR VEHICLE

CROSS-REFERENCE TO RELATED APPLICATION

This application claims priority to and the benefit of Korean Patent Application No. 10-2014-0192931 filed in the Korean Intellectual Property Office on Dec. 30, 2014, and No. 10-2014-0192933 filed in the Korean Intellectual Property Office on Dec. 30, 2014, the entire contents of which are incorporated herein by reference.

BACKGROUND OF THE INVENTION (a) Field of the Invention

The present invention relates to a mounting unit of a shock absorber for a vehicle. More particularly, the present invention relates a mounting unit of a shock absorber for a vehicle that can mount a shock absorber to a vehicle body.

(b) Description of the Related Art

Generally, a shock absorber is a constituent element of a suspension system, and provided to absorb or attenuate a load inputted from a road surface when the vehicle is driven.

A lower portion of the shock absorber is respectively connected to a front wheel and a rear wheel of a vehicle, and an upper portion of the shock absorber is fixedly mounted to a vehicle body. When the vehicle is driven, the shock absorber absorbs external load inputted from the front wheel and the rear wheel, and the remained load is distributed to the vehicle body.

The shock absorber connected to the front wheel of the vehicle is connected to a shock absorber housing mounted to an upper portion of a wheel housing by a bolt.

That is, the conventional shock absorber is connected to the vehicle body through a shock absorber mounting unit comprising a tapping nut engaging the shock absorber housing and the shock absorber housing.

According to the conventional shock absorber mounting unit, since additional tapping process that forms a screw thread at the shock absorber housing for engaging the tapping nut, manufacturing process and cost are increased.

Further, if defected products generated when the screw thread is formed at the shock absorber housing are discarded, thus manufacturing cost is increased.

Meanwhile, since the general shock absorber housing that mounts the shock absorber to the vehicle body is manufactured by die-casting process, ribs for reinforcing the stiffness of the shock absorber housing are formed at the shock absorber housing and thickness of the shock absorber housing is locally different from each other.

However, according to the conventional shock absorber housing, the shock absorber housing is manufactured by die-casting process, thus strength of the shock absorber housing is deteriorated by bubbles generated through casting process and non-uniformity of materials. And it is difficult to monitor these defects by naked eyes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mounting unit of a shock absorber for a vehicle that can stably assemble a shock absorber to a shock absorber housing. Further, the present invention has been made in an effort to provide the mounting unit of the shock absorber for the vehicle that can decrease manufacturing cost and time by removing additional tapping process. Further, the present invention has been made in an effort to provide the mounting unit of the shock absorber for the vehicle that can increase stiffness of a mounting portion of the shock absorber.

Further, the present invention has been made in an effort to provide the mounting unit of the shock absorber for the vehicle that can have uniform thickness and increase processability. Further, the present invention has been made in an effort to provide the mounting unit of the shock absorber for the vehicle that can effectively distribute load inputted through the shock absorber.

A mounting unit of a shock absorber for a vehicle that fixes an upper portion of a shock absorber connected to wheels to a vehicle body according to an exemplary embodiment of the present invention may include a shock absorber housing mounted to the vehicle body; a mounting module disposed in the shock absorber housing, and at least two mounting hole is formed at the mounting module; a tapping nut engaged through a mounting hole of the mounting module in the shock absorber housing; and a fixing nut engaged to an end portion of the tapping nut protruded to outside of the shock absorber housing and fixing the mounting module to the shock absorber housing; the mounting module and fixing nut are temporarily assembled to the shock absorber housing through a temporarily assembly apparatus and engaged to the tapping nut.

The mounting module may include at least two mounting portion in which the mounting hole is formed, and the mounting portions are spaced with a predetermined distance; and a connecting portion connecting the mounting portions with each other.

The mounting module may be formed of four mounting portions, the four mounting portions are disposed in four directions with the predetermined distance, and the four mounting portions are connected with each other through the connecting portion, such that the mounting module such that the mounting module has a shape of a rectangular frame.

The mounting portion may be formed in a shape of circular plate and mounted at a seating portion of the shock absorber housing, and a screw thread is formed an interior circumference of the mounting hole.

The temporarily assembly apparatus may include at least one first hook protrusion formed at the mounting portion, and the mounting portion may be hooked to the seating portion of the shock absorber housing from the interior toward the exterior of the shock absorber housing through the first hook protrusion.

The temporarily assembly apparatus may include at least one second hook protrusion formed at the fixing nut, and the fixing nut may be hooked to the seating portion of the shock absorber housing from the exterior toward the interior of the shock absorber housing through the second hook protrusion.

A penetration hole that the tapping nut is passed through may be formed at the seating portion.

Hook coupling grooves that the first and second hook protrusions are hooked may be formed at an edge of the penetration hole.

A first supporting groove that avoids interference with the second hook protrusion of the fixing nut may be formed at the mounting portion of the mounting module.

A second supporting groove that avoids interference with the first hook protrusion of the mounting portion may be formed at the fixing nut.

A nut groove engaged with the tapping nut may be formed at the fixing nut, and a cover that covers the nut groove may be formed at the fixing nut.

The tapping nut may be mounted from the interior toward the exterior of the shock absorber housing and protruded outside of the shock absorber housing, and the fixing nut may be engaged to the protruded portion of the tapping nut.

A load distribution portion that distributes load inputted through the shock absorber may further formed at the mounting module.

The load distribution portion may be disposed to be perpendicular to the mounting portion and the connecting portion.

The shock absorber housing may be integrally formed by aluminum die-casting.

the mounting portion and the connecting portion may be integrally formed.

A mounting unit of a shock absorber for a vehicle according to another exemplary embodiment of the present invention a shock absorber housing that fixes an upper portion of a shock absorber connected to wheels to a vehicle body; a mounting module disposed in the shock absorber housing, at least two mounting portion is formed at the mounting module, a mounting hole is formed at the mounting portion, the mounting portions are spaced with a predetermined distance and connected through a connecting portion, and the mounting portions and the connecting portions are integrally formed; a tapping nut engaged to the mounting hole of the mounting portion in the shock absorber housing, and an end portion of the tapping nut is protruded to outside of the shock absorber housing; a fixing nut engaged to the end portion of the tapping nut and fixing the mounting module to the shock absorber housing; and a temporarily assembly apparatus that includes a hook protrusion for temporarily assembling the mounting module and the fixing nut to the shock absorber housing.

A seating portion for supporting the mounting portion of the mounting module may be formed at the shock absorber housing.

A penetration hole that the tapping nut is passed through may be formed at the seating portion, and a hook coupling groove that the hook protrusion is hooked may be formed at an edge of the penetration hole.

A load distribution portion that distributes load inputted through the shock absorber may be further formed at the mounting module.

The load distribution portion may be disposed to be perpendicular to the mounting portion and the connecting portion.

According to an exemplary embodiment of the present invention, the shock absorber can be stably assembled to the shock absorber housing 10 mounted to the vehicle body through the mounting module. Since a tapping process of the shock absorber housing 10 is removed, defect product of the shock absorber housing 10 can be avoided, and manufacturing cost and time can be reduced Further, since the shock absorber is mounted through the mounting module, it is possible to increase stiffness of the shock absorber housing and thus vibration inputted through the shock absorber is effectively absorbed.

Further, since the mounting module is fixed to the shock absorber in a state where the mounting module and a fixing nut is temporarily assembled, assemble of the mounting module is easy.

Further, since the shock absorber housing is made by press-forming, material of the shock absorber housing is uniform, manufacturing time is decreased, it is possible to monitor the defects of the shock absorber housing, load inputted through the shock absorber is effectively distributed, and stiffness of the shock absorber housing is improved.

Further, since the shock absorber housing can be replaced by removing from the shock absorber housing when the mounting module is broken, maintenance is easy and the cost for repair is reduced.

BRIEF DESCRIPTION OF THE DRAWINGS

The drawings are provided to be referred in explaining exemplary embodiments of the present invention and the spirit of the present invention should not be construed in the limit of the accompanying drawing.

DETAILED DESCRIPTION OF THE EMBODIMENTS

Figure 1:
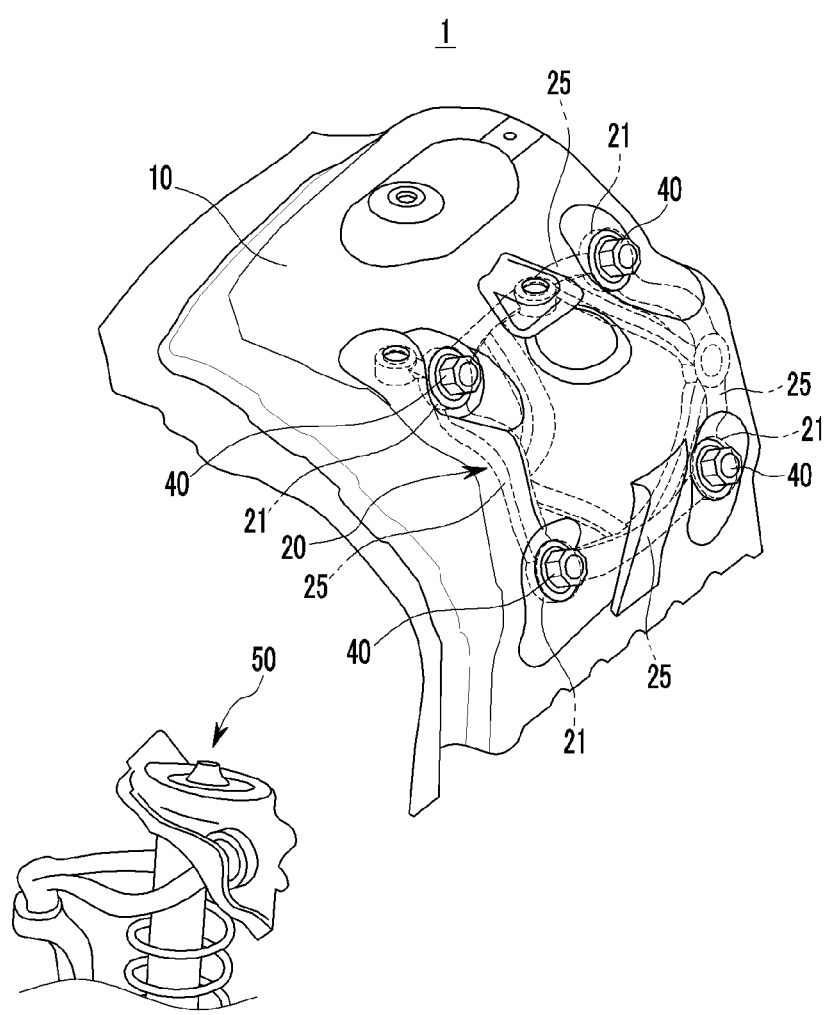
FIG. 1 is a perspective view illustrating a mounting unit of a shock absorber for a vehicle according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Further, the size and thickness of each component shown in the drawings are arbitrarily shown for understanding and ease of description, but the present invention is not limited thereto, and the thickness of parts, regions, etc., are exaggerated for clarity.

In the following description, dividing names of components into first, second, and the like is to divide the names because the names of the components are the same as each other and an order thereof is not particularly limited.

In addition, unless explicitly described to the contrary, the word "comprise" or variations such as "comprises" or "comprising" will be understood to imply the inclusion of stated elements but not the exclusion of any other elements.

Further, the terms, " . . . unit", " . . . means", " . . . portion", " . . . member" etc. used herein mean the unit of inclusive components performing at least one or more functions or operations.

Figure 2:
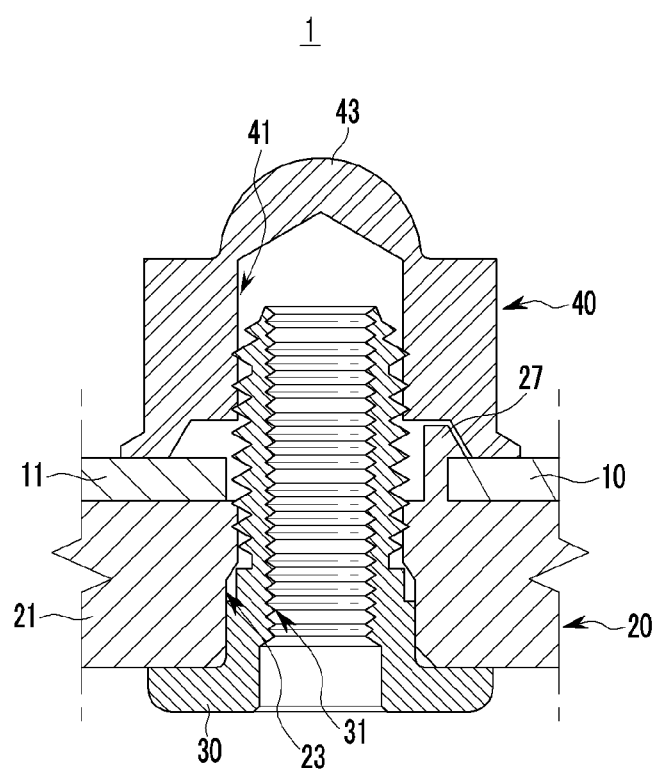
FIG. 2 is a cross-sectional view illustrating a mounting unit of a shock absorber for a vehicle according to an exemplary embodiment of the present invention.

FIG. 1 is a perspective view illustrating a mounting unit of a shock absorber for a vehicle according to an exemplary embodiment of the present invention. FIG. 2 is a cross-sectional view illustrating a mounting unit of a shock absorber for a vehicle according to an exemplary embodiment of the present invention.

Referring to FIG. 1 and FIG. 2, according to an exemplary embodiment of the present invention, a mounting unit of a shock absorber for a vehicle 1 has a structure such that assembles a shock absorber (not shown) to a shock absorber housing 10 mounted to a vehicle body, defected products of shock absorber housing 10 can be prevented and manufacturing time is reduced by removing additional tapping process, the mounting unit is easily assembled, and stiffness of a portion on which the shock absorber is mounted is improved.

As shown in FIG. 1 and FIG. 2, the mounting unit of the shock absorber for the vehicle 1 according to an exemplary embodiment of the present invention is a structure such that can fix an upper portion of the shock absorber to a vehicle body in order to absorb vibration and impact inputted from road when the vehicle is driven. The mounting module includes a shock absorber housing 10, a mounting module 20, a tapping nut 30 and a fixing nut 40.

The shock absorber housing 10 is mounted at an upper portion of a wheel housing (not shown) of the vehicle body corresponding to a mounting position of the shock absorber, and connected to a side upper member (not shown) provided in the traverse direction of the vehicle body The shock absorber housing 10 is made of metal plate having a uniform thickness for easy manufacturing. For example, the shock absorber housing 10 is manufactured by press forming.

As an alternative plan, the shock absorber housing 10 may be manufactured by die-casting and integrally formed in order to reduce weight and maintain stiffness.

Figure 3:
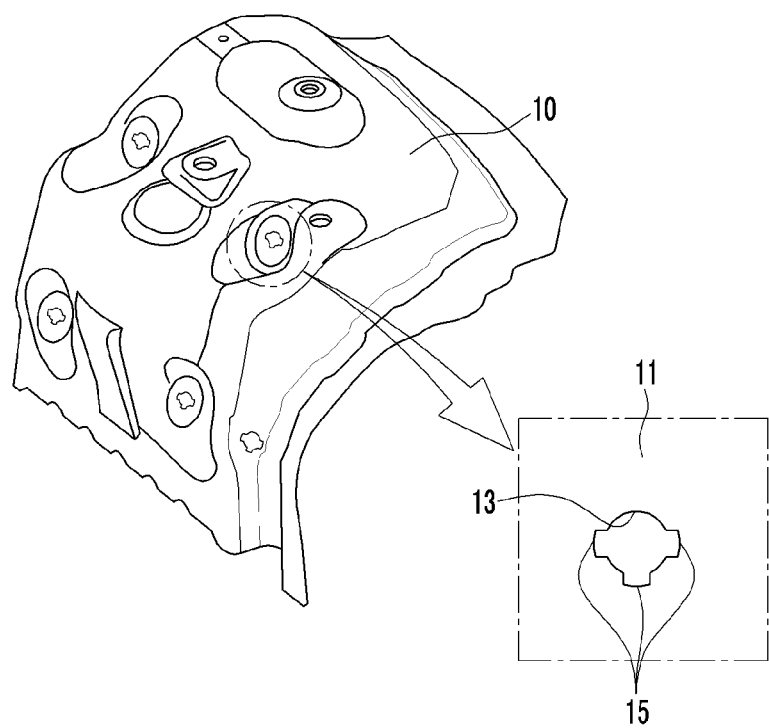
FIG. 3 is a perspective view illustrating a shock absorber housing applied to a mounting unit of a shock absorber for a vehicle according to an exemplary embodiment of the present invention.

As shown in FIG. 3, a plurality of seating portion 11 for mounting a fixing nut 40 and a mounting module 20 is formed at the shock absorber housing 10. The mounting module 20 is mounted inside of the shock absorber housing 10. In the exemplary embodiment of the present invention, four seating portions 11 are formed.

The seating portion 11 is formed as a circular shape, and a penetration hole 13 is formed at the seating portion 11. And a tapping nut 30, will be described later, passes through the penetration hole 13. In the seating portion 11, a plurality of hook coupling groove 15 is formed at an edge of the penetration hole 13. The hook coupling grooves 15 are respectively formed at left side, right side, and lower side base on the penetration hole 13, in FIG. 3.

Figure 4:
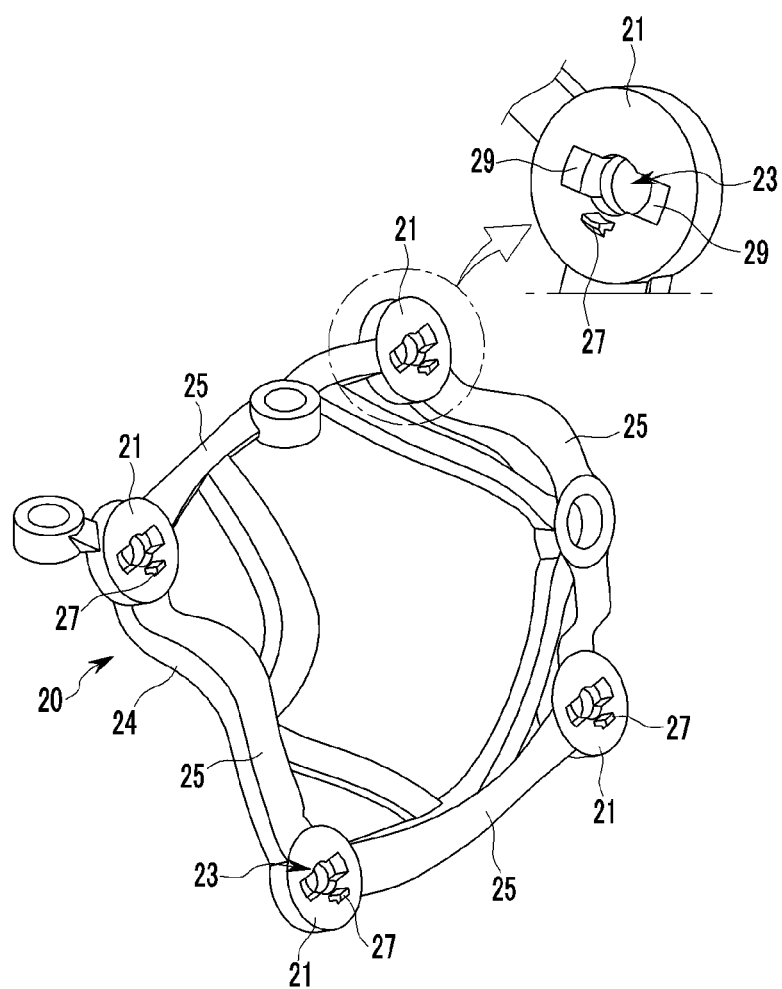
FIG. 4 is a perspective view illustrating a mounting module applied to a mounting unit of a shock absorber for a vehicle according to an exemplary embodiment of the present invention.

Referring to FIG. 1, FIG. 2, and FIG. 4, the mounting module 20 is disposed at the inside of the shock absorber housing 10, and at least two mounting hole 23 is formed at the mounting module 20. The mounting module 20 may include a mounting portion 21 and a connecting portion 25.

The mounting portion 21 is mounted at the seating portion 11 in the shock absorber housing 10. A mounting hole 23 is formed at the mounting portion 21. At least two or more mounting portions 21 are provided and they are disposed with a predetermined distance. The number of mounting portions may be changed according to an upper size and shape of the shock absorber.

The mounting portion 21 is formed in a shape of circular plate and supported to the seating portion 11 of the shock absorber housing 10. A screw thread is formed at interior circumference of the mounting hole 23 by tapping process. The connecting portions 25 respectively connect the mounting portions 21 with each other.

The mounting module 20 is formed of four mounting portions 21, the four mounting portions 21 are disposed in four directions with the predetermined distance. The four mounting portions 21 are connected with each other through the connecting portion 25 such that the mounting module 20 has a shape of a rectangular frame. The mounting portion 21 and the connecting portion 25 may be integrally manufactured.

That is, the plurality of mounting portion 21 of the mounting module 20 are disposed with the predetermined distance corresponding to a upper shape of the shock absorber applied to the vehicle, and the mounting portions 21 are connected with each other through the connecting portion 25. The mounting module 20 may be integrally manufactured by die-casting using aluminum material or molding using plastic material such as reinforced plastic.

The mounting module 20 is mounted in the shock absorber housing 10 such that strength of the shock absorber housing 10 is improved. Simultaneously, the shock absorber is mounted to the shock absorber housing 10 through the mounting portion 21.

In an exemplary embodiment of the present invention, four mounting portions 21 are disposed in four directions with the predetermined distance, the mounting portions 21 are connected with each other through the connecting portions 25, and the mounting portions 21 and the connecting portions 25 are integrally manufactured. Therefore, the mounting module 20 has a shape of a rectangular frame. However, present invention is not limited thereto. The number and position of the mounting portion 21, and shape of the mounting module 20 may be changed according to the upper shape of the shock absorber.

The mounting module 20 according to an exemplary embodiment of the present invention further include a load distribution portion 24 that distributes load inputted through the shock absorber.

The load distribution portion 24 is formed between the mounting portion 21 and the connecting portion 25 of the mounting module 20, and disposed to be perpendicular to the mounting portion 21 and the connecting portion 25. For example, the load distribution portion 24 may connect a pair of mounting portion 21 and a pair of connecting portion 25 in a vertical direction. That is, the connecting portions 25 are disposed in a horizontal direction, and the load distribution portion 24 is vertically extended from an end portion of the connecting portions 25 to a vertical direction with respect to the connecting portions 25. Here, the vertical direction may mean a direction that load is inputted.

The load distribution portion 24 uniformly distributes load inputted from the shock absorber to the mounting portion 21 and the connecting portion 25, thus strength of the shock absorber housing 10 is increased, and performance of absorbing vibration which is inputted into the shock absorber housing 10 through the shock absorber is increased.

The mounting module 20 further includes a temporarily assembly apparatus. The temporarily assembly apparatus temporarily assembles the mounting portion 21 of the mounting module 20 to the seating portion 11 of the shock absorber housing 10 in the shock absorber housing 10. The temporarily assembly apparatus includes at least one first hook protrusion 27 formed at the mounting portion 21 of the mounting module 20.

The first hook protrusion 27 is protruded from the mounting portion 21, and is hooked to the seating portion 11 of the shock absorber housing 10 from the interior toward the exterior of the shock absorber housing 10. That is, since the first hook protrusion 27 is hooked to the seating portion 11 in the shock absorber housing 10 and protruded to outside of the shock absorber housing 10, the mounting module 20 is fixed to the seating portion 11 of the shock absorber housing 10 by the first hook protrusion 27.

The first hook protrusion 27 may be hooked to a hook coupling groove 15 formed a lower edge of the penetration hole 13 in the seating portion 11 of the shock absorber housing 10. The first hook protrusion 27 is hooked to the hook coupling groove 15 in the shock absorber housing 10, and the protruded portion of the first hook protrusion 27 is fixed to the seating portion 11 of the shock absorber housing 10.

As shown FIG. 1 and in FIG. 2, the tapping nut 30 is engaged through the mounting hole 23 of the mounting module 20 in the shock absorber housing 10.

The tapping nut 30 fixedly mounts the mounting module 20 on the shock absorber housing 10, and mounts an upper portion of the shock absorber on the shock absorber housing 10 through the mounting module 20. An end portion of the tapping nut 30 is protruded from the interior toward the exterior protrude of the shock absorber housing 10, and the protruded portion of the tapping nut 30 is engaged with the fixing nut 40.

A fastening hole 31 is formed at a center of the tapping nut 30 along a length direction. An engage bolt (not shown) for fastening the shock absorber is engaged passing through the fastening hole 31. Therefore, the upper portion of the shock absorber is mounted to the shock absorber housing 10 through the engage bolt (not shown) engaged with the fastening hole 31 of the tapping nut 30.

Figure 5A:
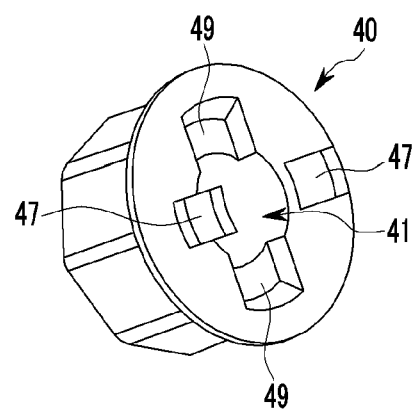
FIGS. 5A and 5B are drawings illustrating a fixing nut applied to a mounting unit of a shock absorber for a vehicle according to an exemplary embodiment of the present invention.
Figure 5B:
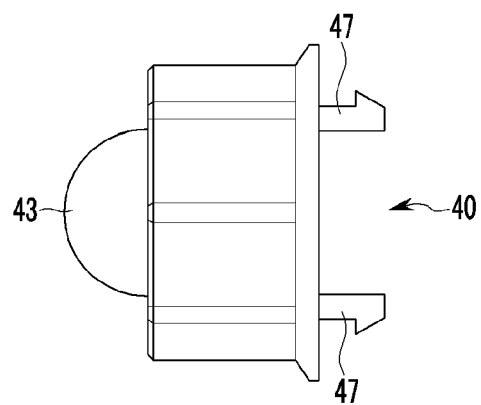

Referring to FIG. 1, FIG. 2 and FIG. 5, a nut groove 41 engaged with the tapping nut 30 is formed at the fixing nut 40 and a cover 43 that covers the nut groove 41 is formed at the fixing nut 40.

When the foreign particles or moisture is flowed into the shock absorber housing 10, the mounting module 20 and the tapping nut 30 through the nut groove 41, the shock absorber housing 10, the mounting module 20 and the tapping nut 30 may be corroded. Therefore, the cover 43 prevents the foreign particles or moisture from flowing into the shock absorber housing 10, the mounting module 20 and the tapping nut 30.

Meanwhile, the temporarily assembly apparatus assembles the fixing nut 40 to the seating portion 11 of the shock absorber housing 10 outside of the shock absorber housing 10. For this, the temporarily assembly apparatus further include a second hook protrusion 47 formed at the fixing nut 40.

The second hook protrusion 47 is formed at a lower portion of the fixing nut 40. The second hook protrusion 47 may be provided in a pair. The second hook protrusion 47 is hooked to the seating portion 11 of the shock absorber housing 10 from the exterior toward the interior of the shock absorber housing 10. That is, since the second hook protrusion 47 is hooked to the seating portion 11 of the shock absorber housing 10 outside of the shock absorber housing 10 and protruded to inside of the shock absorber housing 10, the fixing nut 40 is fixed to the seating portion 11 of the shock absorber housing 10 by the second hook protrusion 47.

The second hook protrusion 47 may be hooked to the hook coupling groove 15 formed a left and right edge of the penetration hole 13 in the seating portion 11 of the shock absorber housing 10. The second hook protrusion 47 is hooked to the hook coupling groove 15 outside of the shock absorber housing 10, and the protruded portion of the second hook protrusion 47 is fixed to the seating portion 11 of the shock absorber housing 10.

The mounting module 20 may be temporarily assembled to the seating portion 11 of the shock absorber housing 10 through the first hook protrusion 27 of the mounting portion 21 in the shock absorber housing 10, and the fixing nut 40 may be temporarily assembled to the seating portion 11 of the shock absorber housing 10 through the second hook protrusion 47 outside of the shock absorber housing 10.

In order to avoid interference between the second hook protrusion 47 and the mounting portion 21, a pair of first supporting groove 29 that supports the second hook protrusion 47 of the fixing nut 40 is formed at a left and right edge of the mounting hole 23 (refer to FIG. 4).

Further, in order to avoid interference between the first hook protrusion 27 and the fixing nut 40, a second supporting groove 49 is formed at an edge of the nut groove 41 of the fixing nut 40.

Hereinafter, an assembling process of the mounting unit of the shock absorber for the vehicle according to an exemplary embodiment of the present invention will be described in detail with reference to accompanying drawings.

FIG. 6 to FIG. 10 are drawings illustrating assembling process of a mounting unit of a shock absorber for a vehicle according to an exemplary embodiment of the present invention.

Figure 6:
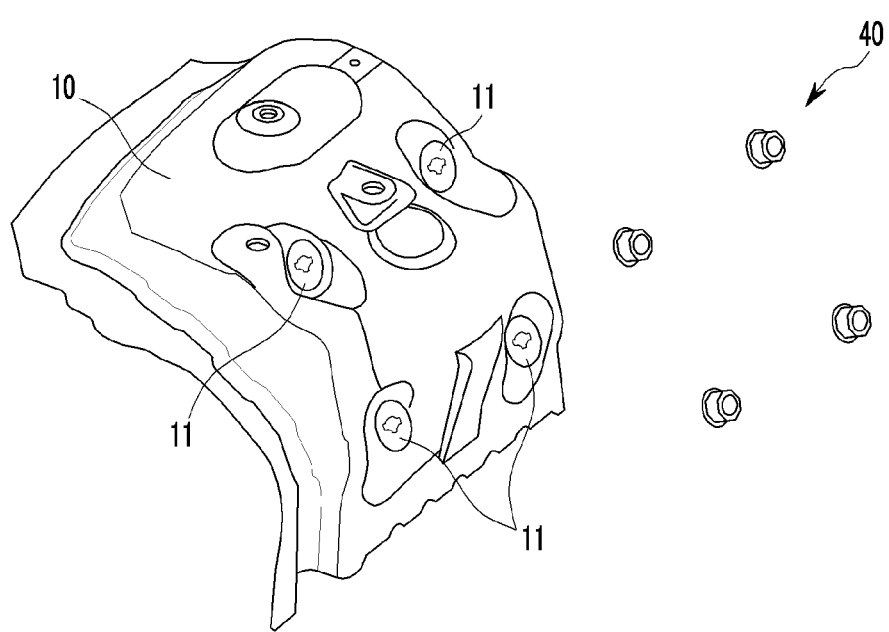
FIG. 6 to FIG. 10 are drawings illustrating assembling process of a mounting unit of a shock absorber for a vehicle according to an exemplary embodiment of the present invention.
Figure 7A:
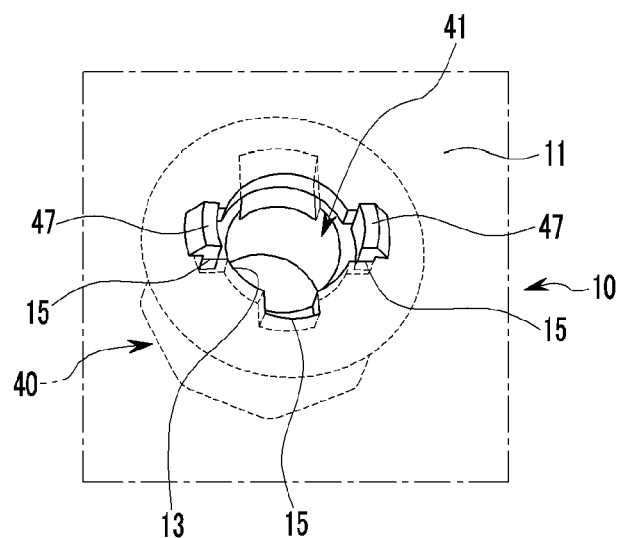
Figure 7B:
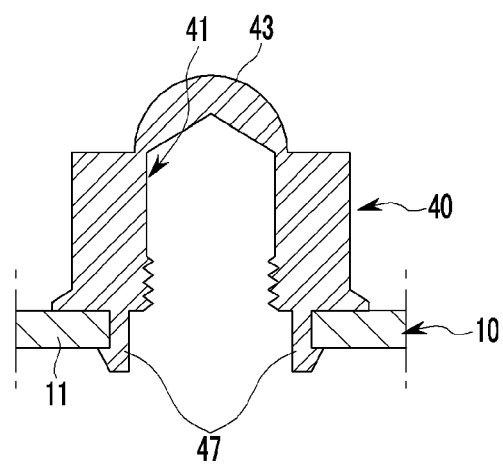

Referring to FIG. 6 and FIG. 7, the fixing nut 40 is temporarily assembled to the seating portion 11 of the shock absorber housing 10 through the second hook protrusion 47.

The second hook protrusion 47 may be hooked to the hook coupling groove 15 formed at the left and right edge of the penetration hole 13 of the seating portion 11. The second hook protrusion 47 is hooked to the hook coupling groove 15 from the exterior toward the interior of the shock absorber housing 10, and the protruded portion of the second hook protrusion 47 fixes the seating portion 11 in the shock absorber housing 10.

Figure 8:
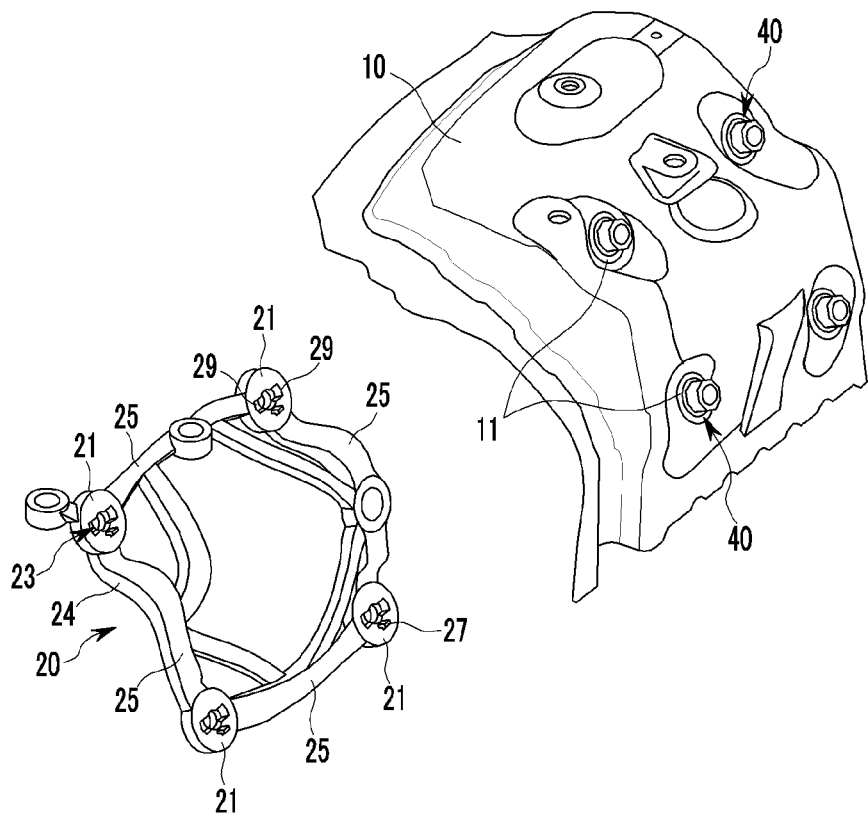
Figure 9A:
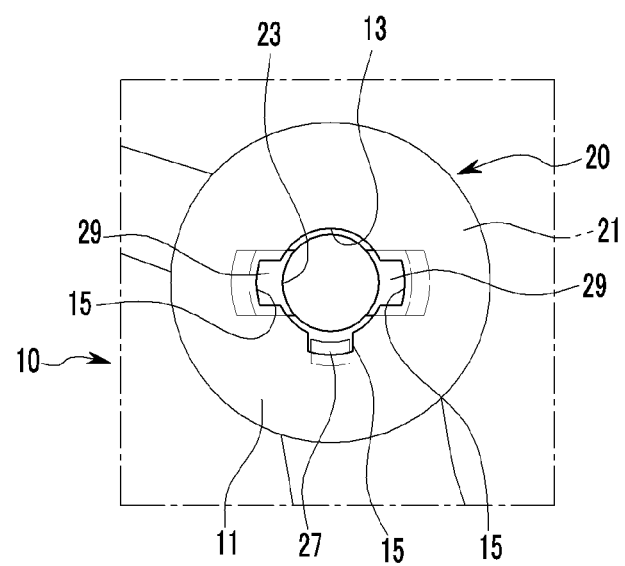
Figure 9B:
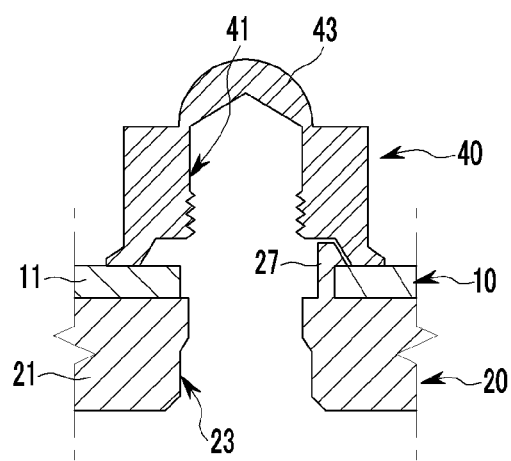

As shown in FIG. 8 and FIG. 9, the mounting portion 21 of the mounting module 20 is positioned corresponding to the seating portion 11 of the shock absorber housing 10 in a state where the fixing nut 40 is temporarily assemble to the seating portion 11 outside of the shock absorber housing 10.

The mounting portion 21 is temporarily assembled to the seating portion 11 of the shock absorber housing 10 through the first hook protrusion 27.

The first hook protrusion 27 may be hooked to the hook coupling groove 15 formed at the lower edge of the penetration hole 13 of the seating portion 11. The first hook protrusion 27 is hooked to the hook coupling groove 15 from the interior toward the exterior of the shock absorber housing 10, and the protruded portion outside of the first hook protrusion 27 fixes the seating portion 11 of the shock absorber housing 10.

The second hook protrusion 47 of the fixing nut 40 is supported to the first supporting groove 29 of the mounting portion 21, and the first hook protrusion 27 of the mounting portion 21 is supported to the second supporting groove 49 of the fixing nut 40 in a state where the mounting portion 21 of the mounting module 20 and the fixing nut 40 is temporarily assembled to the seating portion 11 of the shock absorber housing 10.

Figure 10:
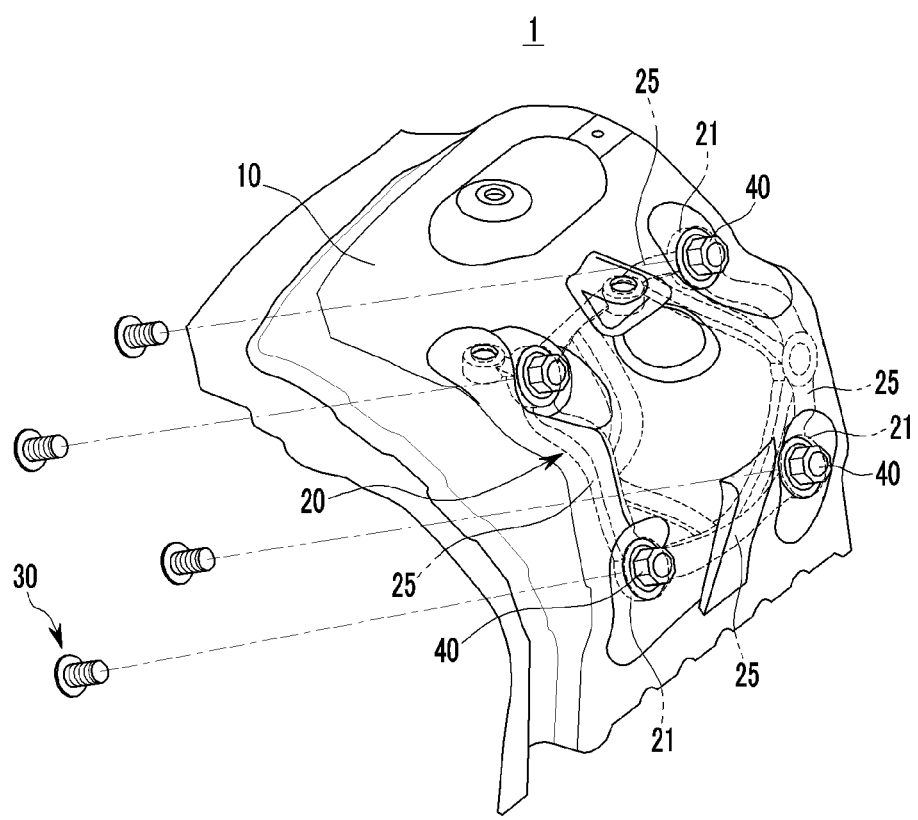

As shown in FIG. 10, after the mounting portion 21 of the mounting module 20 and the fixing nut 40 are temporarily assembled to the seating portion 11 of the shock absorber housing 10, the tapping nut 30 is engaged with the mounting hole 23 of the mounting portion 21 and the nut groove 41 of the fixing nut 40, and thus the mounting module 20 is fixedly assembled to the inside of the shock absorber housing 10.

Since the mounting portion 21 of the mounting module 20 and the fixing nut 40 are respectively assembled to the seating portion 11 of the shock absorber housing 10 through the first and the second hook protrusion 27, 47, the mounting module 20 and the fixing nut 40 are not separated from the shock absorber housing 10 before the tapping nut 30 is engaged. It does not need to additionally fix the mounting module 20 and the fixing nut 40 when the tapping nut 30 is engaged, and the mounting portion 21 of the mounting module 20 and the fixing nut 40 are engaged at one time through the tapping nut 30.

According to an exemplary embodiment of the present invention, since the tapping nut 30 is engaged with the mounting portion 21 and the fixing nut 40 in a state where the mounting portion 21 of the mounting module 20 and the fixing nut 40 are temporarily assembled with the seating portion 11 of the shock absorber housing 10 through the first and second hook protrusion 27 and 47, the mounting module 20 is easily assembled and assemble time is reduced.

Further, when the mounting module 20 is broken by vibration and impact transferred through the shock absorber during the vehicle travels, the mounting module 20 is easily separated by disengagement of the tapping nut 30. Therefore, maintenance cost of the mounting module 20 is reduced.

Further, according to an exemplary embodiment of the present invention, the shock absorber can be stably assembled to the shock absorber housing 10 mounted to the vehicle body through the mounting module. Since a tapping process of the shock absorber housing 10 is removed, defect product of the shock absorber housing 10 can be avoided, and manufacturing cost and time can be reduced.

Further, according to an exemplary embodiment of the present invention, the mounting module 20 is manufactured to be coupled to and separated from the shock absorber housing 10, the mounting portion 21 and the connecting portion 25 are integrally formed, and the shock absorber is mounted to the shock absorber housing 10 through the mounting module 20. Therefore, strength of the shock absorber housing 10 is increased, performance for absorbing vibration and durability can be improved by increasing stiffness of the shock absorber mounting unit 1, and acceleration noise and road noise transfer to the vehicle body can be reduced.

Particularly, according to an exemplary embodiment of the present invention, since the load distribution portion 24 is provided in the mounting module 20, load transferred to the shock absorber housing 10 from the shock absorber is uniformly distributed to the mounting portion 21 and the connecting portion 25, stiffness of the shock absorber housing 10 is increased.

Further, since the stiffness of the shock absorber mounting unit 1, riding and handling (R&H) performance and noise vibration harness (NVH) of the vehicle can be improved, such that entire marketability of the vehicle can be improved.

Further, since the shock absorber housing 10 is made by press forming using metal plate, material thickness of the shock absorber housing 10 is uniform, processing time of the shock absorber housing 10 is short, and defect of the shock absorber housing 10 can be monitored by naked eyes. Further, when the mounting module 20 is broken, the mounting module 20 can be separated from the shock absorber housing 10 and easily replaced with new mounting module 20. Therefore, maintenance is easy and maintenance cost is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description Of Symbols>

| 1 | shock absorber mounting unit | 10 | shock absorber housing |
|---|---|---|---|
| 11 | seating portion | 13 | penetration hole |
| 15 | hook coupling groove | 20 | mounting module |
| 21 | mounting portion | 23 | mounting hole |
| 25 | connecting portion | 27 | first hook protrusion |
| 29 | first supporting groove | 30 | tapping nut |
| 31 | fastening hole | 40 | fixing nut |
| 41 | nut groove | 43 | cover |
| 47 | second hook protrusion | 49 | second supporting groove |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mounting unit of a shock absorber for a vehicle that fixes an upper portion of the shock absorber connected to wheels to a vehicle body, comprising:
a shock absorber housing mounted to the vehicle body;
a mounting module disposed in the shock absorber housing including four mounting portions each having a mounting hole formed therein and the mounting portions are disposed in four directions with a predetermined distance and a plurality of connecting portions connecting the mounting portions with each other such that the mounting module has a shape of a rectangular frame;
four tapping nuts, each of which is engaged through the mounting hole of the mounting module in the shock absorber housing; and
four fixing nuts, each of which is engaged to an end portion of each of the four tapping nuts protruded to outside of the shock absorber housing and fixing the mounting module to the shock absorber housing,
wherein the mounting module and fixing nut are temporarily assembled to the shock absorber housing through a temporary assembly apparatus and engaged to the tapping nut.

2. The mounting unit of claim 1, wherein
each of the mounting portions is formed in a shape of circular plate and mounted at a seating portion of the shock absorber housing, and a screw thread is formed an interior circumference of the mounting hole,
the temporary assembly apparatus includes at least one first hook protrusion formed at each of the mounting portions, and each of the mounting portions is hooked to the seating portion of the shock absorber housing from the interior toward the exterior of the shock absorber housing through the first hook protrusion.

3. The mounting unit of claim 2, wherein the temporary assembly apparatus includes at least one second hook protrusion formed at the fixing nut, and the fixing nut is hooked to the seating portion of the shock absorber housing from the exterior toward the interior of the shock absorber housing through the second hook protrusion.

4. The mounting unit of claim 3, wherein
a penetration hole that the tapping nut is passed through is formed at the seating portion, and
hook coupling grooves that the first and second hook protrusions are hooked are formed at an edge of the penetration hole.

5. The mounting unit of claim 4, wherein
a first supporting groove that avoids interference with the second hook protrusion of the fixing nut is formed at each of the mounting portions of the mounting module.

6. The mounting unit of claim 5, wherein
a second supporting groove that avoids interference with the first hook protrusion of each of the mounting portions is formed at the fixing nut.

7. The mounting unit of claim 1, wherein
a nut groove engaged with the tapping nut is formed at the fixing nut, and a cover that covers the nut groove is formed at the fixing nut.

8. The mounting unit of claim 7, wherein
the tapping nut is mounted from the interior toward the exterior of the shock absorber housing and protruded outside of the shock absorber housing, and the fixing nut is engaged to the protruded portion of the tapping nut.

9. The mounting unit of claim 1, wherein
a load distribution portion that distributes load inputted through the shock absorber is further formed at the mounting module.

10. The mounting unit of claim 9, wherein
the load distribution portion is disposed to be perpendicular to the mounting portions and the connecting portion.

11. The mounting unit of claim 1, wherein:
the shock absorber housing
is integrally formed by aluminum die-casting.

12. The mounting unit of claim 1, wherein:
the mounting portions and the connecting portions are integrally formed.

13. A mounting unit of a shock absorber for a vehicle comprising:
a shock absorber housing that fixes an upper portion of the shock absorber connected to wheels to a vehicle body;
a mounting module disposed in the shock absorber housing, at least two mounting portions are formed at the mounting module, a mounting hole is formed at each of the mounting portions, the mounting portions are spaced with a predetermined distance and connected through at least one connecting portion, and the mounting portions and the connecting portions are integrally formed;
at least two tapping nuts, each of which is engaged to the mounting hole of the mounting portions in the shock absorber housing, and an end portion of each of the tapping nuts is protruded to an outside of the shock absorber housing;
at least two fixing nuts, each of which is engaged to the end portion of each of the tapping nuts and fixing the mounting module to the shock absorber housing; and
a temporary assembly apparatus that includes a hook protrusion for temporarily assembling the mounting module and the fixing nuts to the shock absorber housing.

14. The mounting unit of claim 13, wherein
a seating portion for supporting each of the mounting portions of the mounting module is formed at the shock absorber housing,
a penetration hole that each of the tapping nuts is passed through is formed at the seating portion, and
a hook coupling groove that the hook protrusion is hooked is formed at an edge of the penetration hole.

15. The mounting unit of claim 13, wherein
a load distribution portion that distributes load inputted through the shock absorber is further formed at the mounting module.

16. The mounting unit of claim 15, wherein
the load distribution portion is disposed to be perpendicular to the mounting portions and the connecting portion.

* * * * *